United States Patent
Pancholi et al.

(10) Patent No.: US 9,627,954 B2
(45) Date of Patent: Apr. 18, 2017

(54) MULTIPHASE LOW LC BUCK REGULATOR

(75) Inventors: Deepak Pancholi, Bangalore (IN); Bhavin Odedara, Bangalore (IN)

(73) Assignee: SanDisk Technologies LLC, Plano, TX (US)

( * ) Notice: Subject to any disclaimer, the term of this patent is extended or adjusted under 35 U.S.C. 154(b) by 248 days.

(21) Appl. No.: 14/009,740

(22) PCT Filed: Jun. 6, 2011

(86) PCT No.: PCT/US2011/039275
§ 371 (c)(1),
(2), (4) Date: Oct. 3, 2013

(87) PCT Pub. No.: WO2012/138360
PCT Pub. Date: Oct. 11, 2012

(65) Prior Publication Data
US 2014/0021931 A1 Jan. 23, 2014

(30) Foreign Application Priority Data
Apr. 8, 2011 (IN) .......................... 1241/CHE/2011

(51) Int. Cl.
*H02M 3/158* (2006.01)
*H02M 1/08* (2006.01)

(52) U.S. Cl.
CPC ........... *H02M 1/08* (2013.01); *H02M 3/1584* (2013.01)

(58) Field of Classification Search
CPC ........... H02M 1/08; H02M 2001/0012; H02M 3/157; H02M 3/1584; H02M 2003/1586
(Continued)

(56) References Cited

U.S. PATENT DOCUMENTS 6,075,295 A * 6/2000 Li .......................... H02M 3/158
307/38
6,222,745 B1 * 4/2001 Amaro ................. H02M 3/157
323/285
(Continued)

OTHER PUBLICATIONS

International Search Report issued in international application No. PCT/US2011/039275, dated Jul. 11, 2012 (3 pages).
(Continued)

*Primary Examiner* — Timothy J Dole
*Assistant Examiner* — Htet Z Kyaw
(74) *Attorney, Agent, or Firm* — Brinks Gilson & Lione (57) ABSTRACT

A buck power converter creates a desired output voltage from a greater input voltage with higher efficiency than linear regulators or charge pumps. For compact-size and cost sensitive products, the use of the buck power converter is hindered mainly because of lack of physical space and increases in the cost of the passive components like the inductor and capacitor. Techniques are presented to reduce the sizes of the passive components so that they can be integrated on-chip or in-package or on board. A signal converter in the buck power converter determines the duty cycle of a switching control signal. The switching control signal would ordinarily have driven a power switching circuit that provides current to the inductor in the buck power converter. The signal converter outputs a modified (multiphase) switching control signal that includes multiple separated on-periods that taken together approximate the duty cycle of the switching control signal while maintaining the same control loop frequency. The multiphase switching signal drives the power switching circuit to provide current to the inductor during each of the multiple separated on-periods so that the output voltage ripple decreases by a factor of the number of phases in the modified switching signal. In this way, if the ripple amplitude is kept same, the sizes of the
(Continued)

passive components can be reduced by the factor of the number of phases in the modified switching control signal.

22 Claims, 9 Drawing Sheets

(58) Field of Classification Search
USPC .................... 323/271, 272, 282, 283–288
See application file for complete search history.

(56) References Cited

U.S. PATENT DOCUMENTS

| | | | |
|---|---|---|---|
| 6,281,822 B1 | 8/2001 | Park | |
| 6,538,484 B1 | 3/2003 | Rappaport et al. | |
| 7,019,505 B2* | 3/2006 | Dwarakanath | H02M 3/157 323/283 |
| 7,148,832 B2* | 12/2006 | Wada | H03M 1/181 341/120 |
| 7,187,311 B2* | 3/2007 | Wada | H03M 1/167 341/155 |
| 7,206,343 B2* | 4/2007 | Pearce | H02M 3/157 327/158 |
| 7,262,628 B2 | 8/2007 | Southwell et al. | |
| 7,675,802 B2 | 3/2010 | Kagan et al. | |
| 7,906,943 B2* | 3/2011 | Isobe | H02M 3/156 323/223 |
| 2004/0146101 A1 | 7/2004 | Pearce | |
| 2009/0058379 A1 | 3/2009 | Sreenivas | |
| 2010/0033236 A1 | 2/2010 | Triantafillou et al. | |
| 2010/0090775 A1* | 4/2010 | Huda | H03K 7/08 332/117 |
| 2013/0335049 A1* | 12/2013 | Schubert | H03K 7/08 323/283 |

OTHER PUBLICATIONS

Chen, Shih-Min et al., Challenge on Compact Size DC-DC Buck Converters with High-Speed Current Sensor and On-Chip Inductors, 2007 50$^{th}$ IEEE Int'l Midwest Symposium on Circuits & Systems (4 pages).
Hazucha, Peter et al., A 233-MHz 80%-87% Efficient Four-Phase DC-DC Converter Utilizing Air-Core Inductors on Package, IEEE Journal of Solid-State Circuits, vol. 40, No. 4, Apr. 2005 (8 pages).
Massa, John, Pulse Width Modulation (PWM) Tutorial, Copyright 2005 by Datadog Systems (2 pages).
Yue, C. Patrick, Design Strategy of On-Chip Inductors for Highly Integrated RF Systems, Copyright 1999 (6 pages).
International Preliminary Report on Patentability issued in international application No. PCT/US2011/039275, dated Oct. 17, 2013 (9 pages).

* cited by examiner

MULTIPHASE LOW LC BUCK REGULATOR

BACKGROUND OF THE INVENTION

1. Technical Field

This disclosure relates to power converters. In particular, this disclosure relates to a step down (buck) power converter with inductor based switching, suitable for use with a memory device (e.g., a flash memory device) or other device.

2. Related Art

Continual development and rapid improvement in semiconductor manufacturing techniques have led to extremely high density memory devices. The memory devices are available in a wide range of types, speeds, and functionality. Memory devices often take the forms, as examples, of flash memory cards and flash memory drives. Today, capacities for memory devices have reached 64 gigabytes or more for portable memory devices such as Universal Serial Bus (USB) flash drives, and one terabyte or more for solid state disk drives. Memory devices form a critical part of the data storage subsystem for digital cameras, digital media players, home computers, and an entire range of other host devices.

One important characteristic of a memory device is its power consumption. In an age when many host devices are powered by limited capacity batteries, every fraction of a watt in power saving translates into extended battery life and extended functionality between recharges for the host device. While the memory device is in operation, a power converter provides the power supply to the memory device. A buck power converter typically has much higher efficiency than other types of power converters. This is one reason that buck converters are frequently preferred over linear regulators and charge pump regulators.

However, memory devices present significant technical challenges to the use of a buck regulator. As one example, the form factor of the circuit board in a memory device is often very small. As a result, it is difficult to find space for large off-chip components like the inductor or capacitor used in a buck regulator. Furthermore, the components add extra cost to the memory device, and cost margins for memory devices are already very small.

The sizes of the inductor and capacitor are inversely proportional to the switching frequency of the control loop in the buck regulator. According, in the past, very high switching frequencies on the order of tens or hundreds of MHz or higher were used. Unfortunately, high switching frequencies increase design complexity and cost, while reducing the overall power efficiency. Moreover, the bandwidth of the components of a buck regulator is generally preferred to be significantly higher (e.g., 10 times or higher) than the switching frequency. This is often a difficult condition to meet, and commonly imposes significant restrictions on the maximum possible switching frequency.

One technique for addressing the technical challenges associated with buck converters is to use a multiphase approach with multiple control loops. Each phase requires its own distinct inductor and switching power transistor pairs. The control loops are driven 180 degrees out of phase. Separate pulse width modulated (PWM) signals drive the distinct power transistor pairs. In other words, the conventional multiphase approach requires multiple inductors equal in number to the number of phases. The convention approach also requires multiple power transistor pairs. As noted above, it is difficult and financially prohibitive to provide these extra components, particularly in a small, inexpensive memory device.

SUMMARY

A buck power converter creates a desired output voltage from a greater input voltage, without requiring multiple inductors or capacitors. The buck power converter has a higher efficiency than linear regulators or charge pumps. The buck power converter uses techniques that reduce the sizes of the inductor and capacitor so that they can be integrated on-chip or in-package or on board.

A signal converter in the buck power converter determines the duty cycle of a switching control signal. The signal converter outputs a modified (multiphase) switching control signal that includes multiple separated on-periods that taken together approximate the duty cycle of the switching control signal while maintaining the same control loop frequency. The multiphase switching signal drives the power switching circuit to provide current to the inductor and capacitor during each of the multiple separated on-periods. The output voltage ripple decreases by a factor of the number of phases in the modified switching signal. In this way, when the ripple amplitude is kept same, the sizes of the passive components may be reduced by the factor of the number of phases in the modified switching control signal.

Other features and advantages of the inventions will become apparent upon examination of the following figures, detailed description, and claims.

BRIEF DESCRIPTION OF THE DRAWINGS

The system may be better understood with reference to the following drawings and description. In the figures, like reference numerals designate corresponding parts throughout the different views.

DETAILED DESCRIPTION OF THE PREFERRED EMBODIMENTS

The discussion below makes reference to host devices and memory devices. A host device may be a wired or wireless device, may be portable or relatively stationary, and may run from DC (e.g., battery power), AC power, or another power source. A host device may be a consumer electronic device such as a personal computer, a mobile phone handset, a game device, a personal digital assistant (PDA), an email/text messaging device, a digital camera, a digital media/content player, a GPS navigation device, a satellite signal (e.g., television signal) receiver, or cable signal (e.g., television signal) receiver. In some cases, a host device accepts or interfaces to a memory device that includes the power converter. Examples of memory devices include memory cards, flash drives, and solid state disk drives. For example, a music/video player may accept a memory card that incorporates the power converter described below, or a personal computer may interface to a solid state disk drive that includes the power converter below. The power converter may be used in other devices, including in the host device itself.

Figure 1:
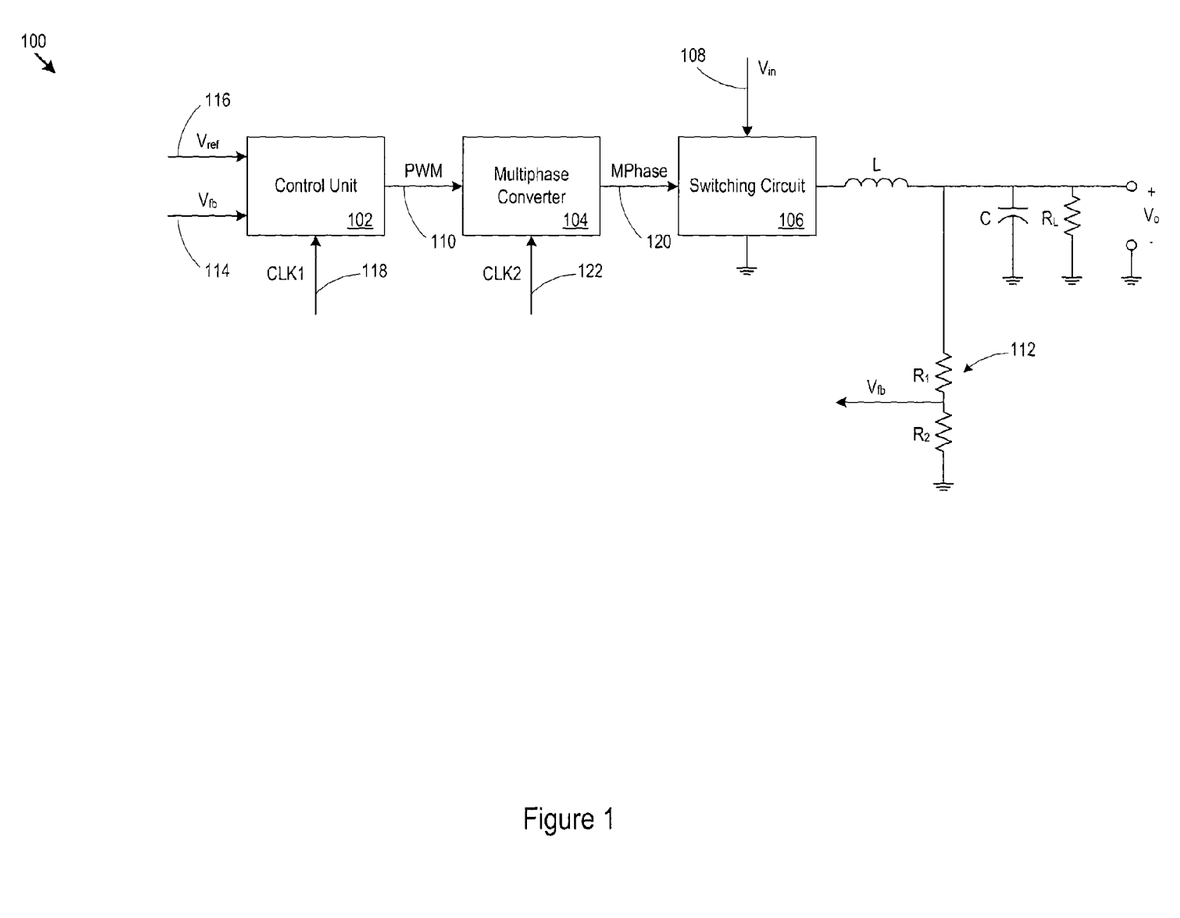
FIG. 1 illustrates a buck power converter.

FIG. 1 illustrates a step-down (buck) switching power converter 100 ("power converter 100"). The power converter 100 includes a control unit 102, a signal converter 104 in communication with the control unit 102, and a switching circuit 106 driven by the signal converter 104. The power switching circuit 106 provides current to an inductor L and a capacitor C as described in more detail below. The power converter 100 provides power to a load (represented in FIG. 1 having a certain load resistance $R_L$) at a specific nominal output voltage $V_o$.

The power converter 100 produces $V_o$ from a reference input voltage $V_{in}$ provided on the voltage reference input 108. To do so, the control unit 102 generates a switching control signal (e.g., a Pulse Width Modulated (PWM) signal) on the switching control signal output 110. The control unit 102, consistent with buck converter design principles, sets the duty cycle of the switching control signal according to the desired reduction in $V_{in}$ needed to obtain $V_o$. As one example, assuming $V_{in}$=3.0V and $V_o$=1.2V, then the duty cycle, D, that the control unit 102 implements is approximately 0.4. In addition, the control unit 102 may adjust the duty cycle of the switching control signal based on a feedback voltage $V_{fb}$ obtained, for example, from $V_o$ by the voltage divider 112. The control unit 102 adjusts the switching control signal based on a comparison of the feedback voltage on the feedback input 114 to a reference voltage $V_{ref}$ provided on the reference input 116. A control clock signal CLK1, provided on the control clock input 118, provides a reference clock for the control unit 102.

However, rather than directly drive a power switching circuit with the PWM signal as in existing buck converters, the PWM signal is first processed by the signal converter 104. The signal converter 104 implements a multiphase conversion that produces a modified switching signal, MPhase, on the modified switching signal output 120. As will be explained in more detail below, the signal converter 104 accepts a conversion clock signal CLK2 on the conversion clock signal input 122. The conversion clock signal is faster than the reference clock (e.g., by a factor of 10, although other factors may be implemented). The signal converter 104 may generate the modified switching signal based on the conversion clock signal as described in more detail below.

In summary, the power converter 100 provides the output voltage $V_o$ by generating a modified switching signal that includes multiple separated on-periods that taken together approximate the duty cycle, D. To that end, the control unit 102 outputs the switching control signal characterized by a particular duty cycle (e.g., 0.4). The signal converter 104 receives the switching control signal and determines the duty cycle. The signal converter 104 also outputs a modified switching signal that includes the multiple separated on-periods that taken together approximate the duty cycle. The modified switching signal drives the power switching circuit 106. The inductor L and the load capacitor C are connected to the power switching circuit. The power switching circuit 106 provides current to the inductor L during each of the multiple separated on-periods, and the capacitor C charges through the inductor L.

Figure 2:
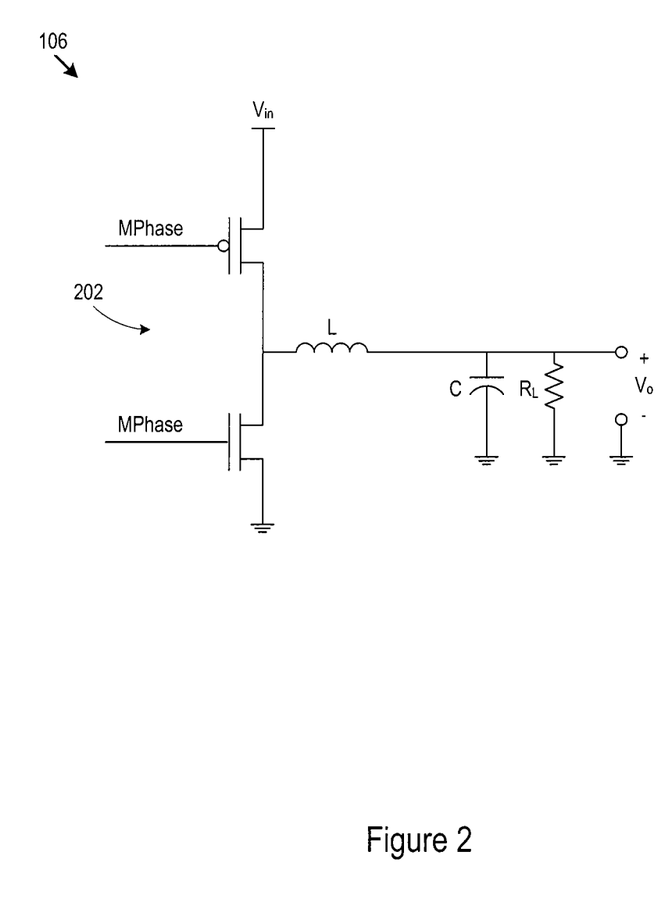
FIG. 2 shows a power switching circuit.
Figure 3:
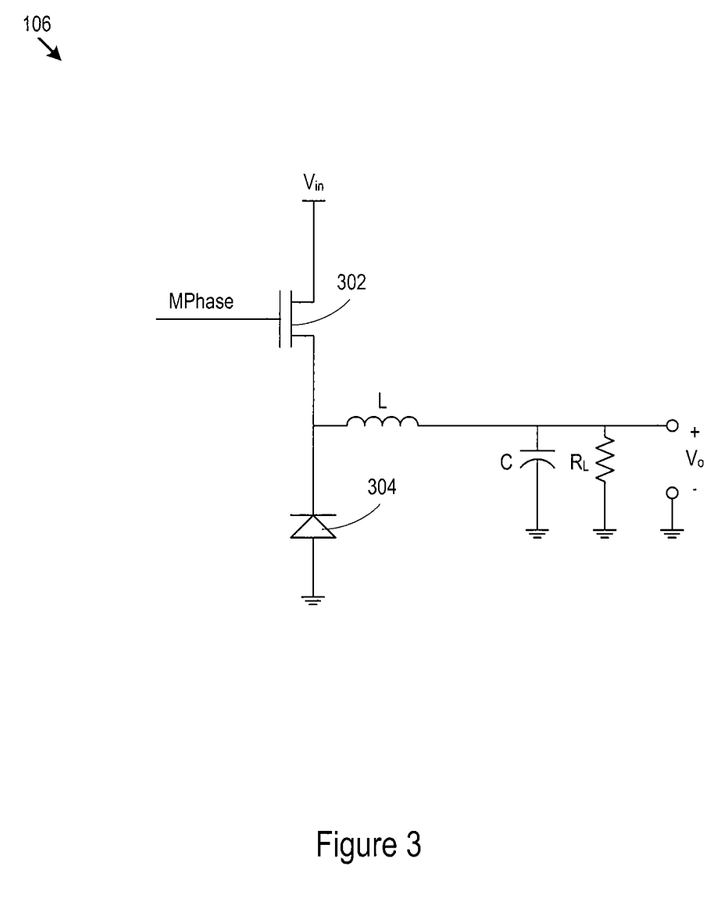
FIG. 3 shows a power switching circuit.

The switching control signal may be a single phase switching signal intended to directly drive a power switching circuit, such as the power switching circuit 106. However, the signal converter 104 instead drives the power switching circuit with the modified switching signal. As shown in FIG. 2, the power switching circuit 106 may include a complementary transistor pair 202 that provides current to the inductor during each of the multiple separated on-periods. As another example, FIG. 3 shows that the power switching circuit 106 may include a transistor 302 and diode 304 in a configuration that provides the current to the inductor.

In one implementation, the signal converter 104 determines the duty cycle of the switching control signal as a clock count of the conversion clock signal. For example, the signal converter 104 may determine (e.g., using a counter) that the duty cycle causes the switching control signal to be asserted for a duration of approximately 4 conversion clocks out of every 10 conversion clocks. The signal converter 104 may then create the multiple separated on-periods in the modified switching signal to extend for, in sum, the clock count. The modified switching signal may include the multiple separated on-periods in the same or different period as the switching control signal. In other words, the signal converter 104 may delay the output of the modified switching signal, e.g., by one or more periods of the switching control signal.

The duty cycles determines an active period and an inactive period of the switching control signal. In one implementation, the signal converter 104 generates the multiple separated on-periods of the modified switching signal to include one or more evenly or unevenly separated on-periods during the active period, and one or more evenly or unevenly spaced separated on-periods during the inactive period. The on-periods during the active period and inactive period taken together approximate the duty cycle. In general, the on-periods may be generated during either or both of the active and inactive periods.

Figure 4:
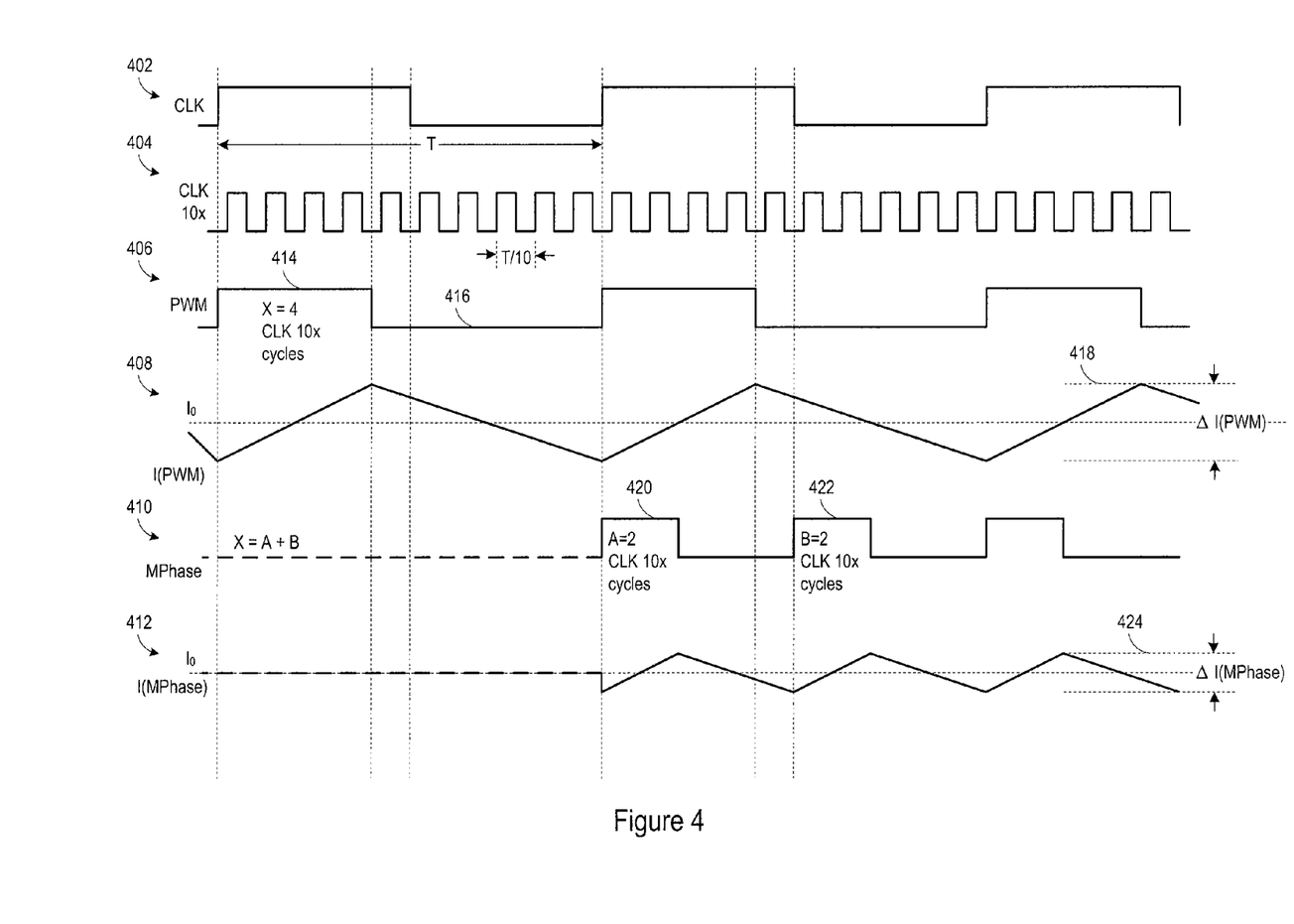
FIG. 4 shows a signal diagram including a modified (multiphase) switching signal.

FIG. 4 shows a signal diagram including a modified switching signal. In particular, FIG. 4 shows the control clock 402, conversion clock 404, and a switching control signal 406. In addition, FIG. 4 shows the inductor current 408 assuming the power switching circuit 106 were directly driven by the switching control signal 406, the modified switching signal 410, and the multiphase inductor current 412 that results from the modified switching signal 410 driving the power switching circuit 106.

The control clock 402 has a period, T. Similarly, the conversion clock 404 has a period that is typically less than T, e.g., T/10. Thus the conversion clock 404 is faster than the control clock 402 by a preselected factor (e.g., 10). The preselected factor may vary widely, and may be chosen due to the availability of various clocks in the device in which the power converter 100 is implemented, may be chosen to keep operation of the power converter 100 within the bandwidth limitations of the circuitry (e.g., a feedback error amplifier and control loop) in the control unit 102, may be chosen to keep the amount of ripple current in the inductor to less than a specific amount, or may be chosen based on other factors or combinations of factors. As one example, the control clock 402 may have a frequency in the range of approximately 1 MHz to approximately 4 MHz, and the conversion clock 404 may have a frequency in the range of approximately 5 MHz to approximately 40 MHz. Other frequencies may be employed depending on the implementation.

In the example shown in FIG. 4, the switching control signal 406 has a duty cycle of approximately 0.4. The duty cycle establishes, in the switching control signal 406, an active period 414 and an inactive period 416. The active period 414 extends for approximately 4 conversion clocks, while the inactive period extends for approximately 6 conversion clocks.

If the switching control signal 406 were used to drive the power switching circuit 106, a relatively large inductor ripple current 408 would result. The inductor current increases during the active period 414 as current flows into the inductor, and decreases during the inactive period 416 as current is no longer provided to the inductor. The amount of ripple in the inductor current 408 is illustrated in FIG. 4 as ΔI (PWM) 418.

The signal converter 104 produces the modified switching signal 410, which results in reduced inductor ripple current. Specifically, FIG. 4 shows that the modified switching signal 410 includes multiple separated on-periods 420 and 422. Each of the on-periods 420 and 422 extend for approximately two conversion clocks, and each may be considered a separate phase, though in the same modified switching signal 410. Taken together, the on-periods approximate the duty cycle of the switching control signal 406 of approximately four conversion clocks.

The modified switching signal 410 drives the power switching circuit 106. As a result, the multiphase inductor current 412 evidences reduced ripple. In particular, the power converter 100 provides current to the inductor for approximately the same amount of time overall, but in multiple separated shorter durations. The reduced amount of ripple in the multiphase inductor current 412 is illustrated in FIG. 4 as ΔI (MPhase) 424. Accordingly, the output voltage ripple also decreases, e.g., by a factor of the number of phases in the modified switching signal. One beneficial result is that the sizes of the passive components may be reduced commensurate with the number of phases in the modified switching signal, while adhering to the same ripple current and voltage design requirements for the power converter 100. In other words, the decrease in ripple current and voltage resulting from the multi-phase implementation permits a change to smaller passive components, which in turn causes a counterbalancing increase in the ripple current and voltage while still meeting the design specification parameters.

FIG. 4 shows that there is a delay in the output of the modified switching signal 410. In particular, the modified switching signal 410 lags one period behind the switching control signal 406. The signal converter 104 may instead output the modified switching signal 410 in the same period as the switching control signal 406, or may delay for additional periods. Whether or not there is a delay, may depend on the implementation of the signal converter 104. For example, the counter in the signal converter 104 may analyze the switching control signal 406 over its first period to determine the number of conversion clocks during which the switching control signal 406 is active, and thus determine the duty cycle of the switching control signal 406. Once the duty cycle is known, the signal converter 104 may then in subsequent periods output the multiple separated on-periods in the modified switching signal 410 to extend, in sum, over the duty cycle in terms of the conversion clock or other time reference.

Figure 5:
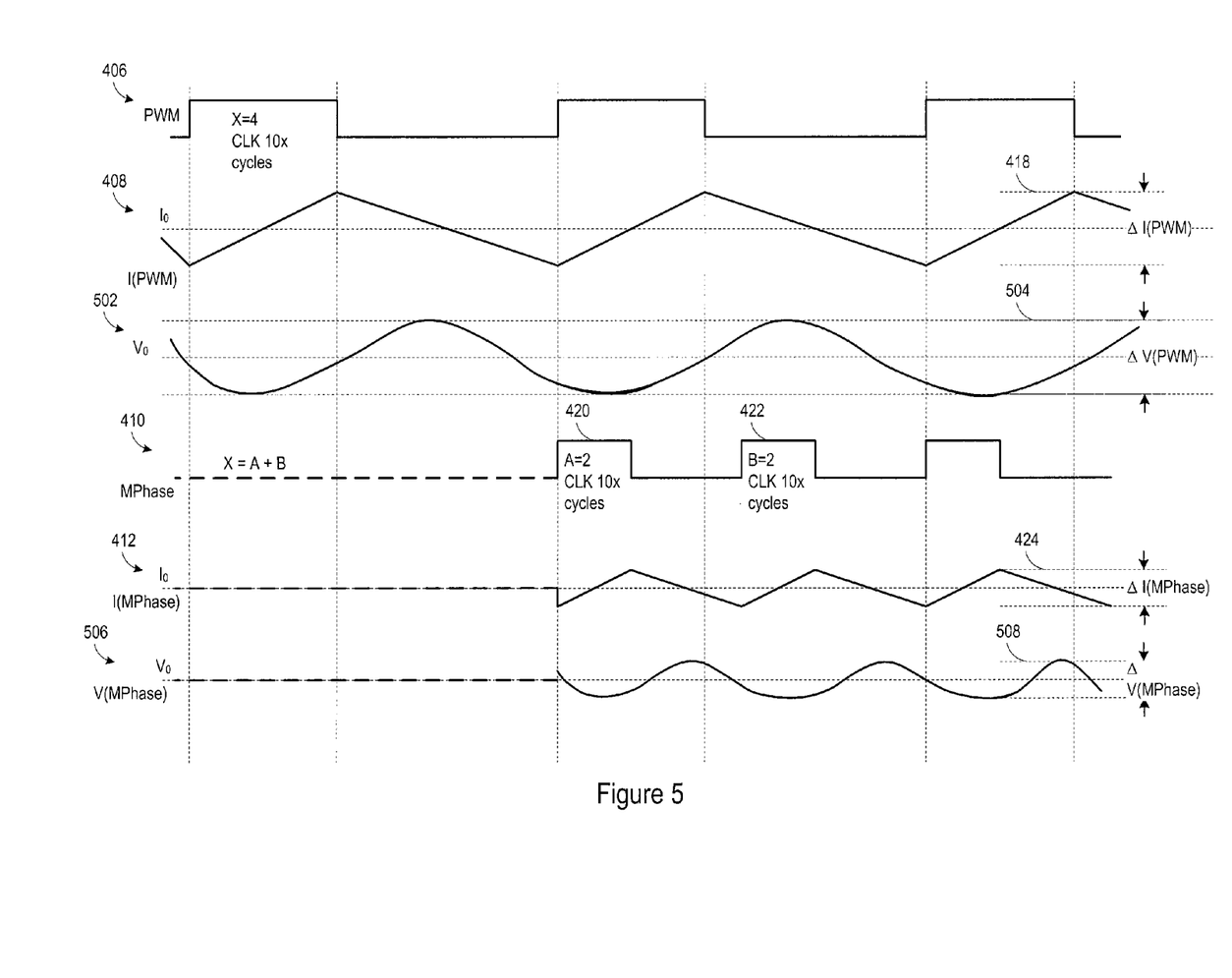
FIG. 5 shows a signal diagram including a modified (multiphase) switching signal.

FIG. 5 continues the example started in FIG. 4. In particular, FIG. 5 shows the inductor voltage signal 502 that results from the inductor current 408 (i.e., from the switching control signal 406, without using the modified switching signal). The amount of voltage ripple caused by the inductor current 408 is illustrated in FIG. 5 as ΔV (PWM) 504. FIG. 5 also shows the inductor voltage signal 506 that results from the inductor current 412 (i.e., from using the modified switching signal 410 to drive the power switching circuit 106). The amount of voltage ripple caused by the inductor current 412 is illustrated in FIG. 5 as ΔV (MPhase) 508 and is reduced by a factor of the number of phases in the modified switching signal 410.

Figure 6:
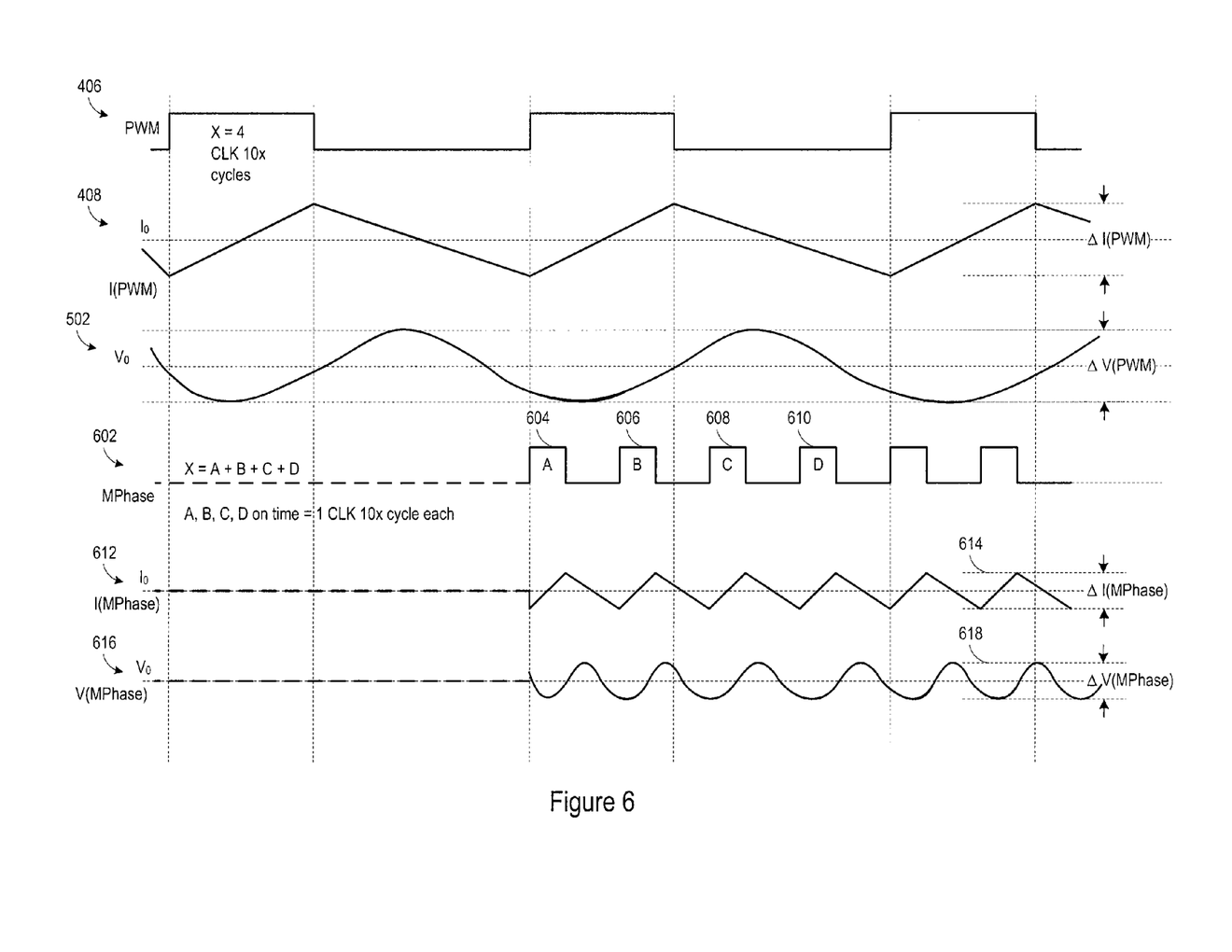
FIG. 6 shows a signal diagram including a modified (multiphase) switching signal.

FIG. 6 illustrates an alternative in which the modified switching signal 602 includes the four on-periods 604, 606, 608, and 610 that taken together approximate the duty cycle of the switching control signal 406. In effect, the modified switching signal 602 includes four phases in the same signal for driving the power switching circuit 106.

Separating the duty cycle into four distinct on-periods results in the inductor current 612. Specifically, the modified switching signal 602 provides current to the inductor for approximately the same period of time as the switching control signal 406, but spread over four separated times. The resulting multiphase inductor current 612 evidences correspondingly reduced ripple because the limited on-times prevent the inductor current from building to levels that would have ordinarily been reached if the switching control signal 406 were used. The amount of ripple in the multiphase inductor current 612 is illustrated in FIG. 6 as ΔI (MPhase) 614. A corresponding reduction in the multiphase inductor voltage 616 is illustrated in FIG. 6 as ΔV (MPhase) 618.

Figure 7:
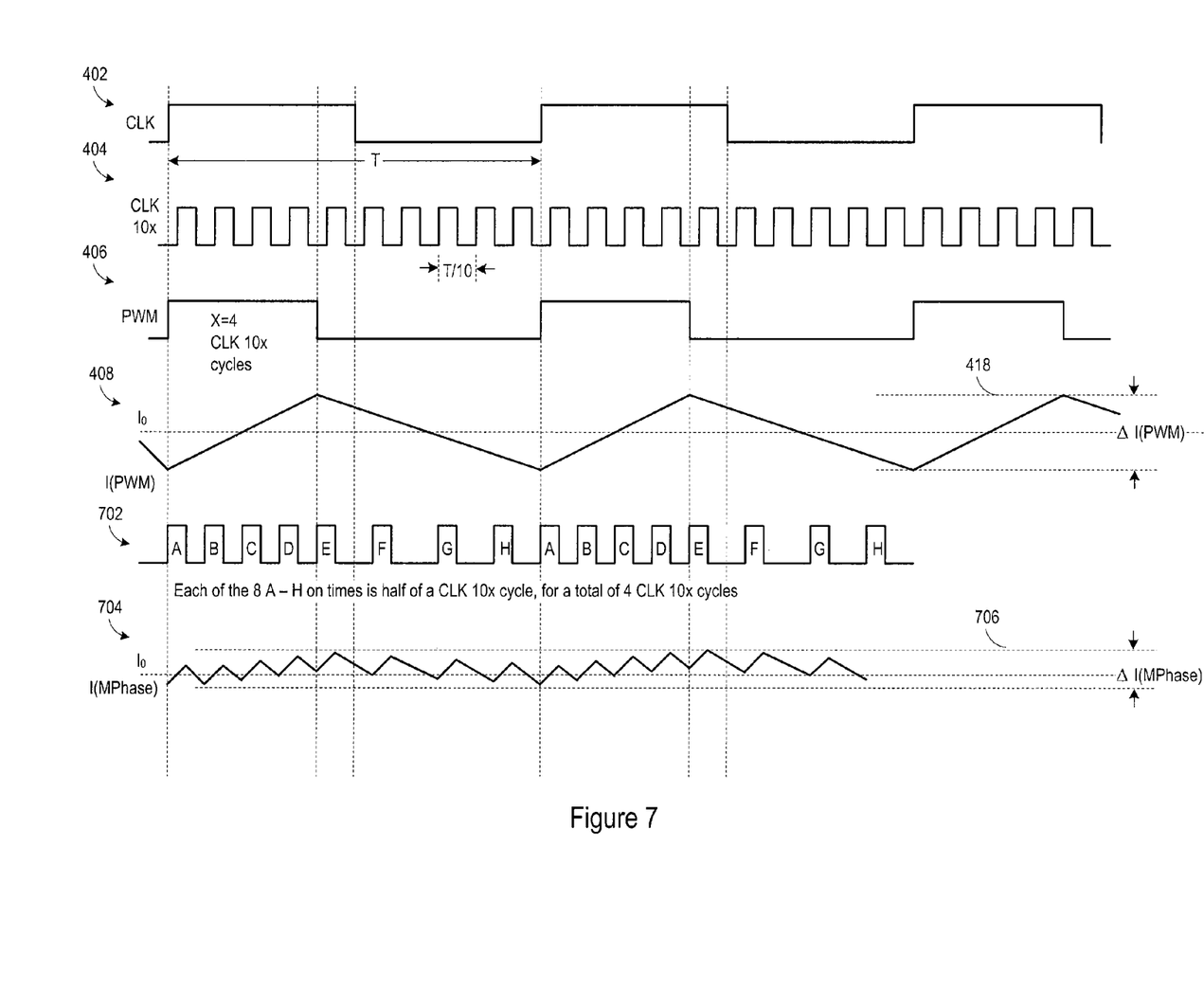
FIG. 7 shows a signal diagram including a modified (multiphase) switching signal.

FIG. 7 shows an example in which the modified switching signal 702 is separated into eight on-times labeled A through H. In total, the on-times approximate the total on-time resulting from the duty cycle in the switching control signal 406. FIG. 7 shows the corresponding reduction in the multiphase inductor current 704.

The example in FIG. 7 illustrates that signal converter 104 may begin to output on-times (e.g., the on-time labeled A) in the modified switching signal 702 as soon as it detects that the switching control signal 406 is asserted. The signal converter 104 may count the duration of the switching control signal 406 (e.g., in terms of the number of conversion clocks). In the meantime, the signal converter 104 continues to output additional on-times. Each on-time may have a specific duration (e.g., half of one conversion clock cycle).

The switching control signal 406 may count the number of on-times that it has output, and when the switching control signal is de-asserted, continue to output on-times until the duty cycle of the switching control signal 406 is approximated by the total number of on-times (and, e.g., in terms of the conversion clock 404). Thus, in FIG. 7, the signal converter 104 continues to provide on-time E, F, G, and H. The spacing between on-time pulses may be even or uneven. If the spacing is kept generally even, then extra ripple can be avoided because there will not be extended periods of time when no current is being supplied to the inductor. In FIG. 7, the signal converter 104 outputs evenly spaced pulses while the switching control signal 406 is asserted (as the signal converter 104 determines the duty cycle), and also outputs evenly spaced pulses while the signal converter 104 outputs the remaining pulses to cover the total on-time for the duty cycle of the switching control signal 406.

In one implementation, the counter logic in the signal converter 104 may perform the following processing: 1) when the switching control signal 406 is asserted, the signal converter 104 asserts the modified switching signal 702 during the on-period of the conversion clock, and de-asserts the modified switching signal 702 during the off-period of the conversion clock; 2) the signal converter 104 counts the number, N, of off-periods of the modified switching signal 702; 3) then, when the switching control signal 406 is de-asserted, the signal converter 104 asserts, in an evenly distributed manner, the modified switching signal 702 N times during the de-asserted time of the switching control signal 406.

Note that the improvements to the inductor sizing may permit additional implementation options for the inductor. For example, the inductor L may be implemented as a board or package trace inductor (e.g., by using a circuit board trace to form the inductor). Alternatively, the inductor may be integrated on-chip or in-package. For example, the power converter 100 may provide the power supply for a flash memory device and may be integrated into the same package or chip as the flash memory device.

Figure 8:
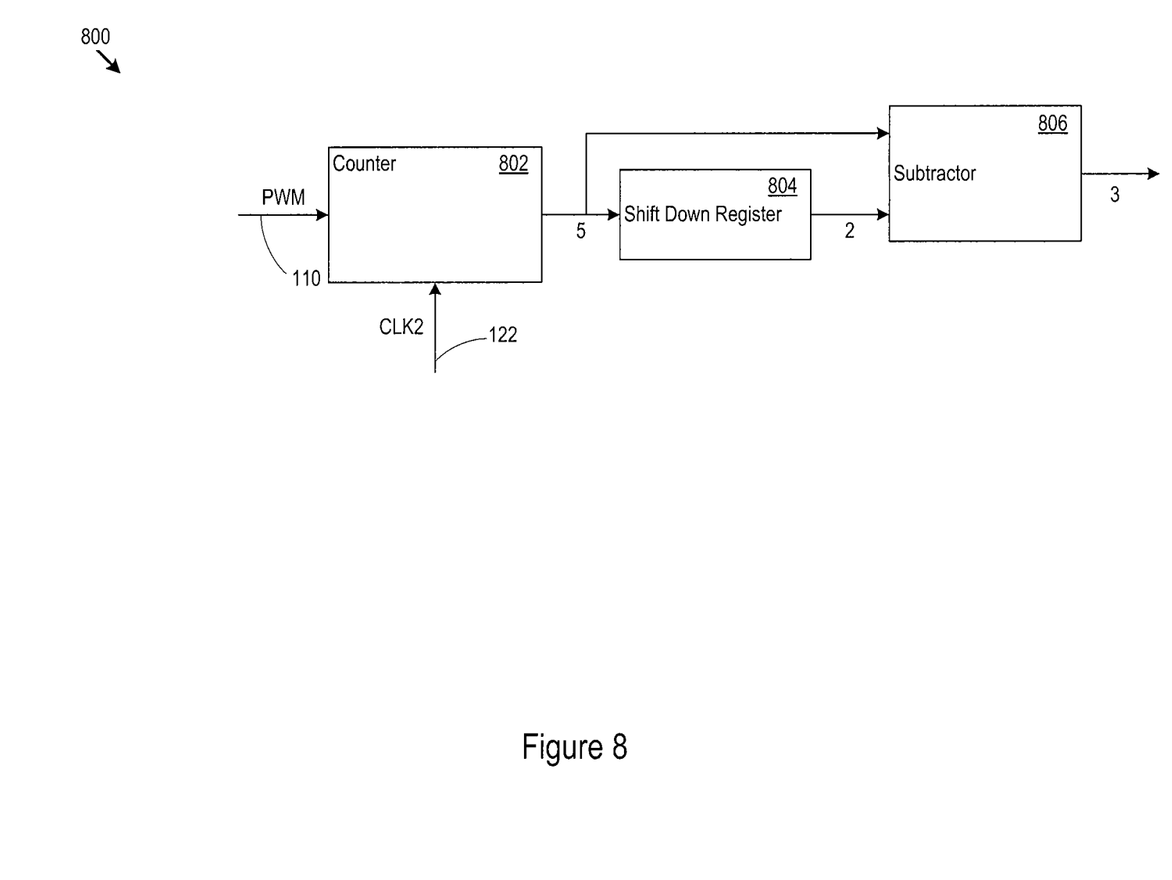
FIG. 8 shows one example of logic for determining the duration of two phases in a modified switching signal.

FIG. 8 shows one example of logic 800 for determining the duration of two phases in the modified switching signal (e.g., the modified switching signal 410). A counter 802 determines the duty cycle of the switching control signal by counting, in terms of the number of conversion clocks, the duration the asserted portion of the switching control signal. In the example shown in FIG. 8, the clock count is five (5). To determine the duration of on-times for the modified switching signal in two phases, the shift down register shifts the count right one place to divide by two (and drop the remainder). The result is two (2) conversion clock counts for the duration of one of the on-times. In addition, the subtractor 806 subtracts the result of the shift register from the clock count to obtain three (3), the duration for the second on-time in the modified switching signal.

Figure 9:
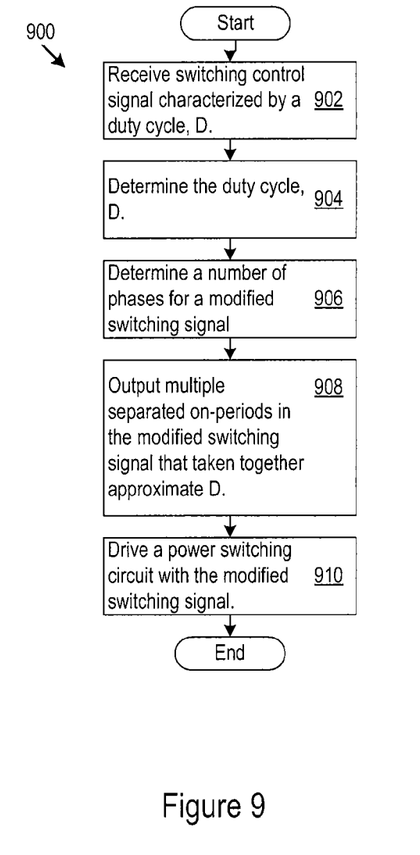
FIG. 9 shows a flow diagram of logic for generating a specific nominal output voltage $V_o$.

FIG. 9 shows a flow diagram of logic 900 for generating a specific nominal output voltage $V_o$. The controller 100 receives a switching control signal characterized by a duty cycle, D (902) and determines the duty cycle, D (904). The switching control signal may be a single phase switching signal, for example, that would ordinarily drive a power switching circuit to provide current to an inductor and capacitor.

The controller 100 will output a modified switching signal that includes a predetermined number of phases (906). As examples, the modified switching signal may include 2, 4, or more phases. For each phase, the signal converter 104 will generate an on-time of a specific duration. In other words, the signal converter 104 outputs multiple separated on-periods in modified switching signal. The multiple separated on-periods, taken together, approximate the duty cycle D.

The power converter 100 drives a power switching circuit 106 with the modified switching signal. As a result, the power converter 100 provides current to an inductor and capacitor during each of the multiple separated on-periods. A desired output voltage $V_o$ results.

As noted above, a control clock signal may be provided to the control unit 102 for generating the switching control signal. Also, a conversion clock signal that is faster than the control clock signal may be provided to the signal converter 104 for generating the modified switching signal. The duty cycle may be determined as a clock count of the conversion clock signal, and the multiple separated on-periods may be created to match the clock count.

The power converter 100 may output all or part of the modified switching control signal in the same period or different period (e.g., delayed by one period or more) as the switching control signal. In some implementations, the duty cycles determines an active period and an inactive period of the switching control signal. Outputting the modified switching signal may then include outputting evenly or unevenly spaced separated on-periods during the active period, and outputting evenly or unevenly spaced separated on-periods during the inactive period. The on-periods during the active period and inactive period taken together approximate the duty cycle.

The design parameters for any particular implementation may vary widely. The design parameters include the inductor, L, and capacitor, C, values, the desired output voltage, the reference input voltage, the source clock frequency, the conversion clock frequency, and other parameters. One specific implementation example is: L=100 nH, C=100 nF, reference clock=1 MHz, conversion clock=50 MHz, reference input voltage=3.3V, and an output voltage programmable from 0.95V to 1.3V.

The methods, control unit 102, signal converter 104, switching circuit 106, and other logic described above may be implemented in many different ways in many different combinations of hardware, software or both hardware and software. For example, all or parts of the power converter 100 may be circuitry in a controller, a microprocessor, or an application specific integrated circuit (ASIC), or may be implemented with discrete logic or components, or a combination of other types of circuitry. Parts of the logic (e.g., counting logic) may be implemented as instructions for execution by a processor, controller, or other processing device and may be stored in a machine-readable or computer-readable medium such as a compact disc read only memory (CDROM), magnetic or optical disk, flash memory, random access memory (RAM) or read only memory (ROM), erasable programmable read only memory (EPROM) or other machine-readable medium. The instructions may be included in firmware that a controller executes. For example, the firmware may be operational firmware for a memory device. The controller may execute the instructions to generate an operating voltage $V_o$ for any desired part of the memory device.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:
1. A switching power converter comprising:
   a control unit operable to output a pulse width modulated switching control signal characterized by a duty cycle;
   a signal converter in communication with the pulse width modulated switching control signal and operable to:
      determine the duty cycle; and
      output a modified switching signal generated from the pulse width modulated control signal, the modified switching signal comprising multiple separated on-periods that taken together approximate the duty cycle, where the multiple separated on-periods are approximately evenly distributed over a period of the pulse width modulated switching control signal;
   a power switching circuit in communication with the modified switching signal;
   an inductor connected to the power switching circuit such that the power switching circuit provides current to the inductor during each of the multiple separated on-periods; and
   a load capacitor charged through the inductor.
2. The switching power converter of claim 1, where the pulse width modulated switching control signal comprises a single phase switching signal.
3. The switching power converter of claim 1, where the power switching circuit comprises a complementary tran- sistor pair that provides current to the inductor during each of the multiple separated on-periods.

4. The switching power converter of claim 1, where the control unit comprises a control clock signal input that carries a control clock signal that the control unit uses to generate the pulse width modulated switching control signal.

5. The power converter of claim 1, where the signal converter comprises a conversion clock signal input that carries a conversion clock signal that is faster than a control clock signal and that the signal converter uses to generate the modified switching signal.

6. The switching power converter of claim 5, where the signal converter is operable to:
determine the duty cycle as a clock count of the conversion clock signal; and
create the multiple separated on-periods to match the clock count.

7. The switching power converter of claim 5, where the signal converter is operable to:
output the modified switching signal in the same period as the pulse width modulated switching control signal.

8. The switching power converter of claim 7, where the duty cycle determines an active period and an inactive period of the pulse width modulated switching control signal, and where the multiple separated on-periods of the modified switching signal comprise:
evenly spaced separated on-periods during the active period; and
evenly spaced separated on-periods during the inactive period, where the evenly spaced separated on-periods during the active period and inactive period taken together approximate the duty cycle.

9. The switching power converter of claim 1, where the signal converter is further operable to:
delay the output of the modified switching signal by at least one period of the pulse width modulated switching control signal while the signal converter determines the duty cycle.

10. A method for power conversion, the method comprising:
receiving a pulse width modulated switching control signal characterized by a duty cycle;
determining the duty cycle;
generating a modified switching signal from the received pulse width modulated switching control signal, the modified switching signal comprising multiple separated on-periods, and approximately evenly distributing the multiple separated on-periods over a period of the pulse width modulated switching control signal, wherein the multiple separated on-periods taken together approximate the duty cycle;
outputting the modified switching signal after delaying the output of the modified switching signal by at least one period of the pulse width modulated switching control signal while determining the duty cycle; and
driving a power switching circuit coupled to an inductor and a load capacitor with the modified switching signal to provide current to the inductor and the load capacitor during each of the multiple separated on-periods.

11. The method of claim 10, where receiving comprises: receiving a single phase switching signal.

12. The method of claim 10, where driving a power switching circuit comprises:
driving a complementary power transistor pair.

13. The method of claim 10, further comprising:
providing a clock signal to a control unit that the control unit uses to generate the pulse width modulated switching control signal.

14. The method of claim 13, further comprising:
providing a conversion clock signal that is faster than the control clock signal and that the signal converter uses to generate the modified switching signal.

15. The method of claim 14, where determining the duty cycle comprises:
determining the duty cycle as a clock count of the conversion clock signal; and further comprising:
creating the multiple separated on-periods to match the clock count.

16. The method of claim 14, where outputting comprises:
outputting the modified switching signal in the same period as the pulse width modulated switching control signal.

17. The method of claim 16, where the duty cycle determines an active period and an inactive period of the pulse width modulated switching control signal, and where outputting comprises:
outputting evenly spaced separated on-periods during the active period; and
outputting evenly spaced separated on-periods during the inactive period, where the evenly spaced separated on-periods during the active period and inactive period taken together approximate the duty cycle.

18. A switching power converter comprising:
a control unit operable to output a pulse width modulated (PWM) switching control signal characterized by a duty cycle that determines an active period and an inactive period of the PWM switching control signal;
a multiphase converter in communication with the PWM switching control signal and operable to:
determine a duration of the active period; and
output a modified switching signal generated from the PWM switching control signal, the modified switching signal comprising multiple separated active pulses that taken together have a duration approximately equal to the duration of the active period, where the multiple separated active pulses of the modified switching signal comprise:
evenly spaced separated active pulses during the active period; and
evenly spaced separated active pulses during the inactive period;
a power switching circuit in communication with the modified switching signal; and
an inductor and a load capacitor connected to the power switching circuit such that the power switching circuit provides current to the inductor and the load capacitor during each of the multiple separated active pulses.

19. The switching power converter of claim 18, where the control unit comprises:
a control clock signal input that carries a control clock signal that the control unit uses to generate the PWM switching control signal, and where the multiphase converter comprises:
a conversion clock signal input that carries a conversion clock signal that is faster than the control clock signal and that the signal converter uses to generate the modified switching signal.

20. The switching power converter of claim 19, where the multiphase converter is operable to:
determine the active period as a clock count of the conversion clock signal; and create the multiple separated active pulses to match the clock count.

21. The switching power converter of claim 18, where the multiphase converter is operable to:
output the modified switching signal in the same period as the PWM switching control signal.

22. The switching power converter of claim 18, where the multiphase converter is further operable to:
delay the output of the modified switching signal by at least one period of the PWM switching control signal while the multiphase converter determines the duration of the active period.

* * * * *